US 6,573,221 B2

(12) United States Patent
Talashek et al.

(10) Patent No.: US 6,573,221 B2
(45) Date of Patent: Jun. 3, 2003

(54) NON-PYRUVYLATED XANTHAN IN OIL FIELD APPLICATIONS UTILIZING HIGH DENSITY CALCIUM-BASED BRINES

(75) Inventors: Todd Talashek, San Diego, CA (US); Mac Seheult, Spring, TX (US); Trish Carter, Houston, TX (US); Reinaldo Navarrete, Houston, TX (US); Helena Chang, Solana Beach, CA (US)

(73) Assignee: CP Kelco U.S., Inc., Wilmington, DE (US)

( * ) Notice: Subject to any disclaimer, the term of this patent is extended or adjusted under 35 U.S.C. 154(b) by 33 days.

(21) Appl. No.: 09/812,895

(22) Filed: Mar. 21, 2001

(65) Prior Publication Data

US 2002/0035040 A1 Mar. 21, 2002

Related U.S. Application Data

(60) Provisional application No. 60/203,899, filed on May 12, 2000.

(51) Int. Cl.[7] .................................................. C09K 7/02
(52) U.S. Cl. .................. 507/110; 507/213; 507/145; 507/277; 507/925
(58) Field of Search ............................. 507/110, 213, 507/145, 277, 925

(56) References Cited

U.S. PATENT DOCUMENTS

| 4,247,402 | A | | 1/1981 | Hartfiel |
| 4,296,203 | A | | 10/1981 | Wernau |
| 4,894,335 | A | * | 1/1990 | Peignier et al. ............. 507/110 |
| 5,175,278 | A | * | 12/1992 | Peik et al. .................. 507/110 |
| 5,514,791 | A | | 5/1996 | Doherty et al. |
| 5,591,699 | A | * | 1/1997 | Hodge ......................... 507/213 |
| 6,432,155 | B1 | * | 8/2002 | Swazey et al. ................ 71/27 |

FOREIGN PATENT DOCUMENTS

EP        0 765 939 A2    4/1997

* cited by examiner

Primary Examiner—Philip Tucker
(74) Attorney, Agent, or Firm—Banner & Witcoff, Ltd.

(57) ABSTRACT

A drilling fluid comprising a pyruvate-free xanthan, which may be an acetate-free pyruvate-free xanthan, and a high density calcium-based brine. Preferably the pyruvate-free xanthan is a genetically prepared pyruvate-free xanthan. A process for recovering crude oil from an oil-bearing subterranean formation by drilling the formation and using a drilling fluid comprising a pyruvate-free gum and a high density calcium-based brine.

24 Claims, 5 Drawing Sheets

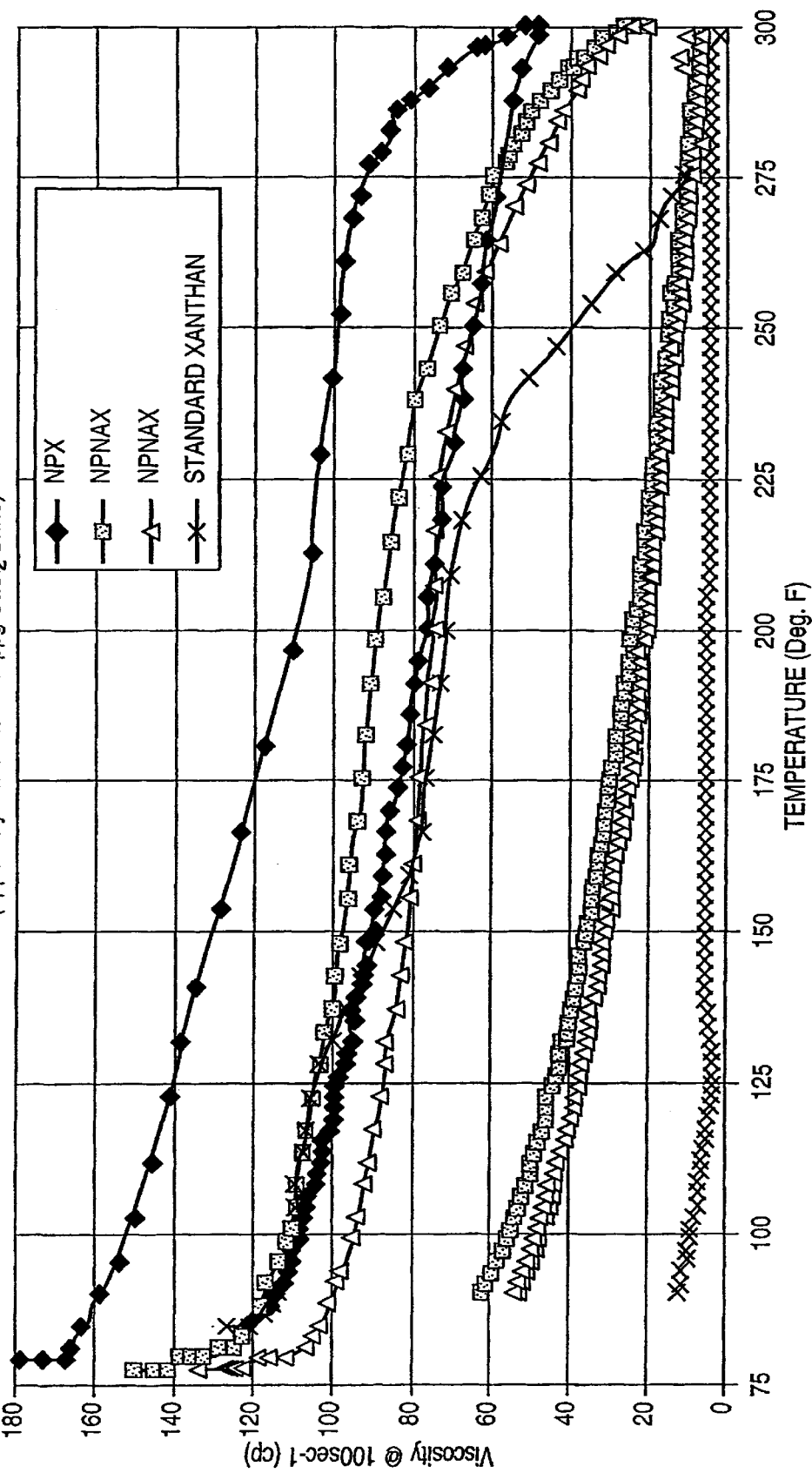

NON-PYRUVYLATED XANTHAN IN OIL FIELD APPLICATIONS UTILIZING HIGH DENSITY CALCIUM-BASED BRINES

Benefit of the May 12, 2000, filing date of the provisional application Ser. No. 60/203,899 by the same inventors and entitled "Non-Pyruvylated Xanthan In Oil Field Applications Utilizing High Density Calcium-Based Brines" is hereby claimed.

FIELD OF THE INVENTION

The present invention relates to the use of non-pyruvylated xanthan in oil field applications utilizing high density calcium-based brines.

BACKGROUND OF THE INVENTION

Brines are used in oil field applications such as in drilling fluids and completion fluids. For instance, during drilling for oil, a drilling fluid is circulated to act as a lubricant and coolant for the drill bit. The drilling fluid also serves to suspend the cuttings and bring them to the surface. In general, a completion fluid is any fluid placed across a production zone prior to or right after perforating the well to bring on production. These fluids are also used to perform workover operations when attempting to improve productivity of a well. The primary objectives of a completion or workover fluid are to provide sufficient hydrostatic pressure to control abnormal subsurface pressures, eliminate the influx of formation fluids, maintain a stable wellbore, and ultimately, minimize formation damage to assure maximum production potential. These fluids also provide a media to remove debris from the wellbore including proppants, sand, metal cuttings and formation solids. Ideally, the fluid should contain a minimum amount of suspended solids which could plug pore throats of the payzone and interrupt production. Brines provide a preferred fluid since they provide a solids free media, yet provide a range of densities required to control formation pressures. Typically, clear brines ranging in density from 8.4 lb/gal to 19.0 lb/gal are used for completion and workover applications.

Brines useful as drilling and completion fluids are often composed of $CaCl_2$ and are thickened prior to use. Important properties of such brines are viscosity and thermal stability. In order to provide the desired properties, xanthan gum is often added to viscosity the brine solution. Xanthan gum produces pseudoplastic rheology which means the viscosity is low under high shear conditions like pumping through the drill bit, but provides high viscosity under low shear conditions encountered in the annular region, thus transporting the cuttings from the wellbore to the surface.

In many cases, these brines are viscosified to:

Improve carrying capacity of the fluid to assure maximum solids transport from the well to the surface.

Provide suspension properties to enable the addition of sized particulates used to bridge pore throats and control fluid leak-off into permeable sections of the well.

Increase low shear rate viscosity to minimize radial flow and depth of fluid or filtrate invasion from the wellbore into a permeable formation.

Brines help minimize the hydration and swelling of smectite clays often encountered during the drilling process. These clays may be present in oil bearing formations, and if allowed to swell, will impede the flow of oil or gas from the reservoir during completion operations. Whereas traditional xanthan has been used to viscosify saline, mono-valent brines, the presence of high concentrations of divalent cations, such as calcium and magnesium, impede polymer hydration, making it difficult to viscosify calcium chloride brines.

SUMMARY OF THE INVENTION

It was discovered that pyruvate-free xanthan provides a means to viscosify a wide range of calcium chloride brines having densities from 9.0 lb/gal (1.08 g/cm$^3$) to 11.6 lb/gal (1.39 g/cm$^3$). Once viscosified, the calcium chloride brine provides a high density drilling fluid system that improves carrying capacity of drilled cuttings, suspension properties, and shale inhibition. These features help minimize problems often associated with inadequate hole cleaning, including stuck pipe, lost circulation, settling of solids in the wellbore and lack of directional control (in horizontal wells). Other benefits include the ability to suspend commercial solids such as calcium carbonate to increase the density of the fluid and provide sized particles to bridge fractures and/or pore throats in an effort to minimize fluid losses to the formation. Finally, calcium chloride formulated systems provide a media to minimize the swelling of in-situ clays which can lead to unstable wellbore conditions, or adversely affect permeability of a producing formation.

The present invention is therefore directed to a drilling, drill in, or completion fluid comprising a pyruvate-free xanthan, which may be an acetate-free pyruvate-free xanthan, and a high density calcium-based brine. Preferably the pyruvate-free xanthan is a genetically prepared pyruvate-free xanthan. The calcium-based brine is preferably a calcium chloride-based brine.

The present invention is further directed to a process for recovering crude oil from an oil-bearing subterranean formation by drilling the formation and using a drilling fluid comprising a pyruvate-free xanthan and a calcium-based brine.

The present invention is also directed to a process for recovering crude oil from an oil-bearing subterranean formation by using a completion fluid comprising a pyruvate-free xanthan and a calcium-based brine.

BRIEF DESCRIPTION OF THE DRAWINGS

FIG. 5 depicts thermal stability of xanthan variants.

DETAILED DESCRIPTION OF THE INVENTION

Figure 1:
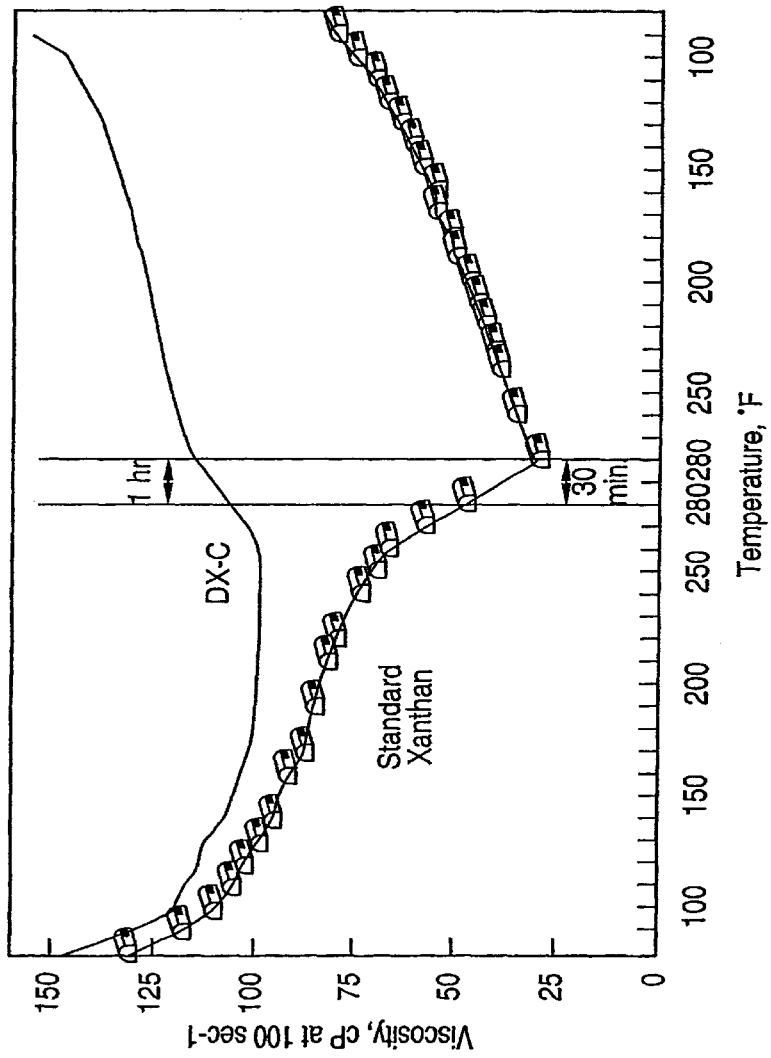
FIG. 1 depicts viscosity v temperature for differentiated xanthan.

It was discovered that xanthan lacking pyruvate substituents (NPX), including non-pyruvylated, acetate-free xanthan gum (NPNAX), added to high density calcium chloride brines provide improved properties over brines containing standard xanthan. High density calcium chloride brines typically have a density of at least about 1.08 g/cm$^3$, preferably at least about 1.20 g/cm$^3$, and more preferably at least about 1.32 g/cm$^3$. Typical ranges include about 1.08 g/cm$^3$ to about 1.39 g/cm$^3$, preferably about 1.20 g/cm$^3$ to about 1.39 g/cm$^3$, and more preferably about 1.32 g/cm$^3$ to about 1.39 g/cm$^3$. Densities higher than 1.39 g/cm$^3$ are also contemplated.

The non-pyruvylated concentration in the brine is preferably 0.01 to 0.20 g/L, preferably 0.02–0.10 g/L, and more preferably 0.025–0.06 g/L.

Xanthan lacking pyruvate substituents has substantially better solubility in high density calcium chloride brines than standard xanthan. In addition, pyruvate-free xanthan is a thickening agent, imparting to the heavy calcium brines the rheology needed for oil field applications such as in drilling and completion fluids.

Pyruvate-free xanthan also has better thermal stability than standard xanthan gum, which is important in drilling applications due to the high temperatures encountered. Pyruvate-free xanthan is thermally stable at temperatures up to 150° C.

Pyruvate-free xanthan is known to be used in enhanced oil recovery (EOR). For example, U.S. Pat. No. 4,296,203 describes the use of pyruvate-free xanthan in brines primarily composed of NaCl (NaCl:CaCl2 ratio of 10:1). Such brines are used as diluents in mobility control solutions; however, xanthan gum tends to precipitate out of these solutions or flocculate. The precipitated particle matter soon plugs the oil-bearing formation at the site of injection and the desired viscosity is lost. The pyruvate-free xanthan improves viscosity and filterability in EOR solutions.

Unlike EOR applications, brines used for drilling or completion fluids are of a relatively higher density and salinity. Many of these brines are saturated or nearly saturated calcium chloride brines.

The xanthan lacking pyruvate substituents, includes xanthan with or without acetate substituents. The differentiated xanthans can be prepared chemically or, preferably, through genetic means (i.e. non-pyruvylated vs. de-pyruvylated).

Non-pyruvylated (NPX) and non-pyruvylated, non-acetylated xanthan gums (NPNAX) can be produced using a genetically engineered strain of *Xanthomonas campestris*. A complete deletion of the xpsL (or Kpt) gene which encodes the ketal pyruvate transferase is made for NPX.

NPNAX can also be prepared using a genetically engineered strain of *Xanthomonas campestris*. This strain can be prepared from the strain that produces non-acetylated xanthan gum (i.e., a strain having deletions in xpsF and xpsG, the genes encoding for acetyl transferase I and II) by deleting the Kpt or pyruvyl transferase gene as above giving a non-acetyled, non-pyruvylated xanthan. Production of NPX and NPNAX by genetic means is also described in U.S. Pat. Nos. 5,514,791 and 4,296,203, each of which is incorporated by reference in its entirety.

Chemical methods can be used to deacetylate or depyruvylate, but conditions for deacetylation or depyruvylation of xanthan are severe, which may result in polymer degradation, so preparing non-pyruvylated xanthan gum through genetic means is preferred. U.S. Pat. No. 5,514,791 recites literature describing the making of depyruvylated and deacetylated xanthan gums through chemical methods.

The term "nonpyruvylated" is used herein to indicate both nonpyruvylated and depyruvylated xanthans and the term "acetate-free" is used herein to indicate both nonacetylated and deacetylated xanthans.

The high density calcium chloride brines containing non-pyruvylated xanthans are used for drilling or completion fluids. These fluids may also contain other ingredients as known by those of skill in the art. For example, drilling fluids typically contain additives for improving temperature stability such as magnesium oxide, and oxygen scavenging agents such as sodium sulfite, fluid loss additives such as sized calcium carbonate, starch, oil soluble resins, mica, sized sand and calcium chloride solids, deflocculants such as lignosulfonates, other thickening agents such as cellulose derivatives like hydroxyethyl cellulose, guar gum and guar derivatives, swellable clays such as bentonite, and low molecular weight polyacrylates.

EXAMPLES

Example 1

Differentiated xanthans (DX-A, DX-B1, DX-C, DX-D1) were evaluated for use in calcium chloride brines ranging in density from 11.0 to 11.6 lb/gal (1.32 to 1.39 s.g.). DX refers to differentiated xanthan.

DX-A is non-acetylated xanthan (NAX)

DX-B1 is non-pyruvylated xanthan (NPX)

DX-C is non-acetylated, non-pyruvylated xanthan (NPNAX)

DX-D1 is standard xanthan

This density range of 11.0 to 11.6 lb/gal (1.32 to 1.39 s.g. (specific gravity)) represents a significant portion of payzone applications varying from drill-in fluids to workover/completions (portion of the formation which yields the desired product such as crude oil, gas, etc.) Traditionally, these fluids are viscosified with HEC (hydroxyethyl cellulose), however, no significant LSRV (low shear rate viscosity) is developed.

Several samples were evaluated for their ability to thicken calcium chloride brines. All samples were initially tested in ASTM seawater. The samples were hydrated in seawater at a gum concentration of 1 lb/bbl (0.0287 g/L) by mixing in a Hamilton Beach mixer for 45 minutes at 11,000 rpm. Rheological data was collected on the solutions at 75° F. using a Fann35 viscometer and a Brookfield Digital Viscometer equipped with a #2 spindle. Results of these measurements as a function of rotational speed (shear rate) are given in centipoise in Table 1.

TABLE 1

|  | DX-A | DX-B1 | DX-C | DX-D1 |
|---|---|---|---|---|
| Fann 35 | | | | |
| 600 rpm | 10 | 10 | 10 | 9.2 |
| 300 rpm | 16 | 16 | 16 | 14 |
| 200 rpm | 20 | 20 | 20 | 18 |
| 100 rpm | 31 | 31 | 51 | 30 |
| 6 rpm | 270 | 270 | 250 | 280 |
| 3 rpm | 480 | 480 | 420 | 480 |
| Brookfield | | | | |
| 1.5 rpm | 3720 | 4240 | 3410 | 4080 |
| 0.6 rpm | 6600 | 8200 | 5780 | 8150 |
| 0.3 rpm | 9750 | 13200 | 8850 | 12800 |

The four different types of xanthan (standard, non-acetylated, non-pyruvylated, and non-acetylated, nonpyruvylated) are hydrated in 11.0 lb/gal (1.32 g/cm$^3$) calcium chloride brine at a xanthan concentration of 2 lb/bbl (0.0573 g/L). Rheological results of these formulations are given in Table 2. For comparison purposes, standard xanthans (SX-A, SX-B, SX-C and SX-D) (2.0 lb/bbl) were combined with 11.0 lb/gal calcium chloride brines. SX refers to standard xanthan. The viscosity (cP) results are shown in Table 2. Standard xanthans are xanthans commercially available that have acetate and pyruvate substituents.

SX-A is a standard xanthan available from Kelco.

SX-B is KELZAN XC-HV available from Kelco.

SX-C is FLOWZAN available from Archer Daniels Midland.

SX-D is RHODOPOL C available from Rhodia.

TABLE 2

|  | DX-A | DX-B1 | DX-C | DX-D | SX-A | SX-B | SX-C | SX-D1 |
|---|---|---|---|---|---|---|---|---|
| Fann 35 | | | | | | | | |
| 600 rpm | 39 | >30 | 48 | >30 | 44 | 38.5 | 39.5 | 33 |
| 300 rpm | 59 | 56 | 70 | 47 | 60 | 51 | 56 | 48 |
| 200 rpm | 69 | 71 | 87 | 57 | 70.5 | 60 | 69 | 60 |
| 100 rpm | 87 | 111 | 129 | 83 | 96 | 87 | 102 | 90 |
| 6 rpm | 500 | 950 | 950 | 550 | 500 | 500 | 700 | 600 |
| 3 rpm | 800 | 1720 | 1600 | 880 | 800 | 800 | 1100 | 1000 |
| Brookfield | | | | | | | | |
| 1.5 rpm | 8680 | 16160 | 26400 | 15980 | 16400 | 14200 | 13300 | 11200 |
| 0.6 rpm | 15200 | 34500 | 57300 | 29950 | 29100 | 25200 | 23700 | 19200 |
| 0.3 rpm | 2200 | 61500 | 100000 | 48000 | 45800 | 41400 | 38700 | 26200 |

A comparison of the viscosities obtained at low shear rates (<=3 RPM) indicates that NPNAX (DX-C) and NPX (DX-B1) have greater solubility and faster hydration than the standard xanthans and NAX in the 1.32 g/cm$^3$ calcium chloride brine as evidenced by higher viscosity values. The viscosity provided at low shear rates is especially important, as low shear rate viscosity is related to the suspension properties of the drilling fluid.

Further mixing at high temperature in a roller oven was used to aid hydration and increase the solubility of the xanthan samples in the calcium chloride brine. A comparison of the viscosity (cP) development of differentiated xanthans (2.0 lb/bbl) in 11.0 lb/gal CaCl$_2$ Brine. The brines were subjected to 45 min. shear @ 12,500 rpm before and after roller aging 16 hr @ 150° F.

TABLE 3

|  | DX-C | | DX-A | |
|---|---|---|---|---|
|  | initial | Aged | Initial | Aged |
| Fann 35 | | | | |
|  | 43 | 52 | 39 | 44 |
|  | 70 | 75 | 59 | 62 |
|  | 87 | 93 | 63 | 70.5 |
|  | 129 | 138 | 87 | 10.5 |
|  | 950 | 1000 | 500 | 750 |
|  | 1600 | 1800 | 800 | 1300 |
| Brookfield | | | | |
| 1.5 rpm | 26400 | 27000 | 8680 | 14600 |
| 0.6 rpm | 57300 | 59100 | 15200 | 27400 |
| 0.3 rpm | 100000 | 102000 | 22000 | 41100 |

These results show very little change in the viscosity of NPNAX with additional mixing and heat aging in the roller oven, while a significant increase in the viscosity of the NAX solution was observed. This indicates the NAX was not fully hydrated after the initial 45 minutes of mixing at 12,500 rpm, while the NPNAX sample was fully hydrated. Even after roller oven aging the viscosity of the NAX solution is substantially lower than that of the NPNAX solution, indicating the NAX solution failed to achieve full hydration after roller oven aging. These results show the enhanced solubility and hydration rate of the NPNAX sample over the NAX sample.

Example 2

The unique solubility and thickening properties of NPX in calcium chloride brines were explored by comparing the viscosities of NPX solutions with those of standard xanthan in saturated (11.6 lb/gal) calcium chloride solutions using a xanthan concentration of 2 lb/bbl (0.0573 g/L). The solutions were mixed at 11,000 rpm using a Hamilton Beach mixer for two hours.

DX-B2 and DX-B3 are NPX samples and DX-D2 and DX-D3 are standard xanthan samples.

|  | 11.6 lb/gal CaCl$_2$ Brine | DX-B2 | DX-B3 | DX-D2 | DX-D3 |
|---|---|---|---|---|---|
| Fann 35 | | | | | |
| 600 rpm | 7.7 | >30 | >30 | 11 | 8.4 |
| 300 rpm | 7.4 | >60 | >60 | 13 | 8.8 |
| 200 rpm | 7.8 | 88 | 88 | 14 | 9 |
| 100 rpm | 8.4 | 136 | 135 | 17 | 9.6 |
| 6 rpm | 20 | 1140 | 1140 | 70 | 25 |
| 3 rpm | 20 | 2080 | 2080 | 100 | 30 |
| Brookfield | | | | | |
| 1.5 rpm | <100 | 19960 | >20000 | 640 | 148 |
| 0.6 rpm | <250 | 43450 | 44650 | 970 | <250 |
| 0.3 rpm | <500 | 78100 | 80500 | 1480 | <500 |

The viscosity results indicate the two NPX samples (DX-B2 and DX-B3) developed high viscosity in the saturated calcium chloride solution, while the two standard xanthan samples had viscosities only slightly higher than the viscosity of the brine without xanthan. The lack of viscosity development of the standard xanthan samples (DX-D2 and DX-D3) indicates the samples are essentially insoluble in the aqueous saturated calcium chloride solution.

The following table shows viscosity results for samples DX-B3 and DX-D3 in seawater (at 1 lb/bbl) and in 11.0 lb/gal calcium chloride (at 2 lb/bbl xanthan) for comparison. This data is given in Tables 1 and 2 for samples DX-B2 and DX-D2.

|  | Seawater DX-B3 | Seawater DX-D3 | 11.0 lb/gal Ca DX-B3 | 11.0 lb/gal Ca DX-D3 |
|---|---|---|---|---|
| Fann 35 | | | | |
| 600 rpm | 8.4 | 9.6 | >30 | >30 |
| 300 rpm | 13 | 15 | 59 | >60 |
| 200 rpm | 16 | 19 | 74 | 81 |
| 100 rpm | 25 | 29 | 115 | 120 |

|  | Seawater DX-B3 | Seawater DX-D3 | 11.0 lb/gal Ca DX-B3 | 11.0 lb/gal Ca DX-D3 |
|---|---|---|---|---|
| 6 rpm | 210 | 240 | 1000 | 810 |
| 3 rpm Brookfield | 370 | 400 | 1820 | 1360 |
| 1.5 rpm | 3020 | 3020 | 17140 | 14840 |
| 0.6 rpm | 5350 | 5600 | 37650 | 27950 |
| 0.3 rpm | 8100 | 8800 | 67600 | 45300 |

From the above table it is apparent that the standard xanthan sample (DX-D3) gives slightly higher viscosities in seawater than the NPX sample (DX-B3). However, when mixed into the 11.0 lb/gal calcium chloride brine, the NPX sample gives significantly higher viscosities than the standard xanthan. This shows the improved viscosifying properties of NPX in high density calcium chloride brines. In saturated calcium chloride brine, the standard xanthan sample becomes nearly insoluble as shown by the lack of viscosity development.

Example 3

NPX and NPNAX not only give enhanced solubility and viscosity development in heavy calcium chloride brines but they also give enhanced thermal stability. The enhanced thermal stability represents an advantage in high temperature applications.

Figure 2:
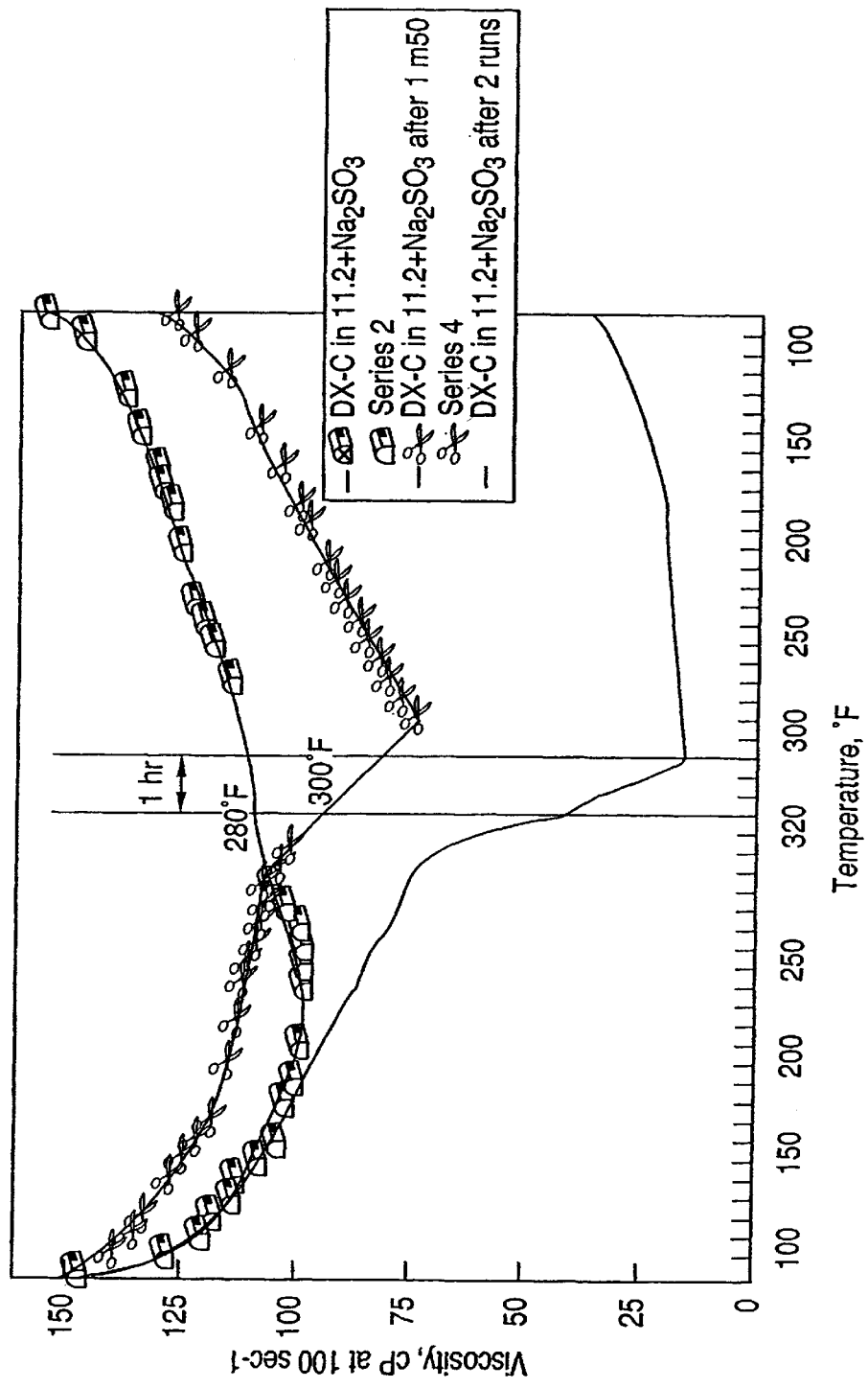
FIG. 2 depicts viscosity v temperature for three consecutive heat cycles of differentiated xanthan.
Figure 3:
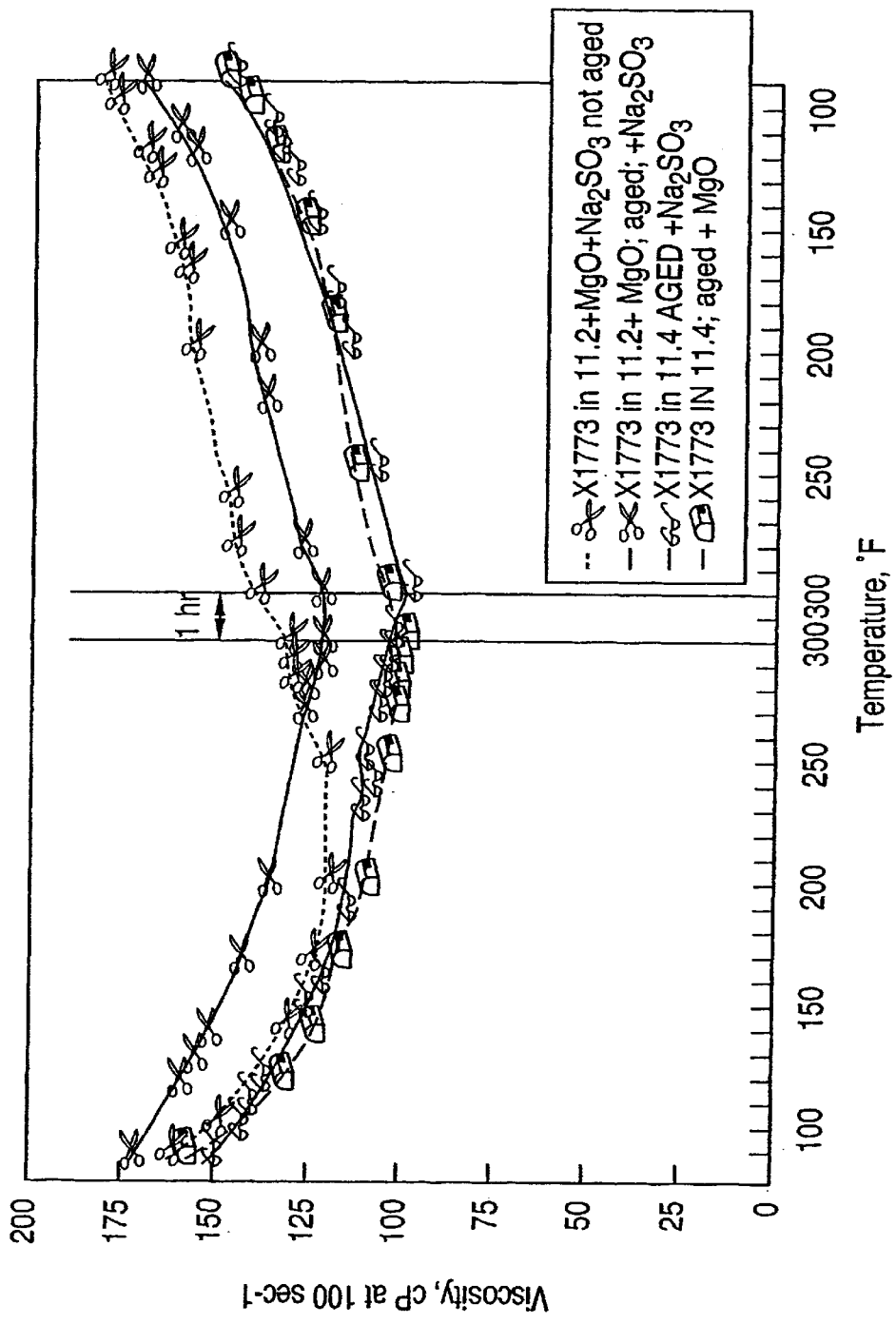
FIG. 3 depicts viscosity v temperature for differentiated xanthan before and after roller aging.
Figure 4:
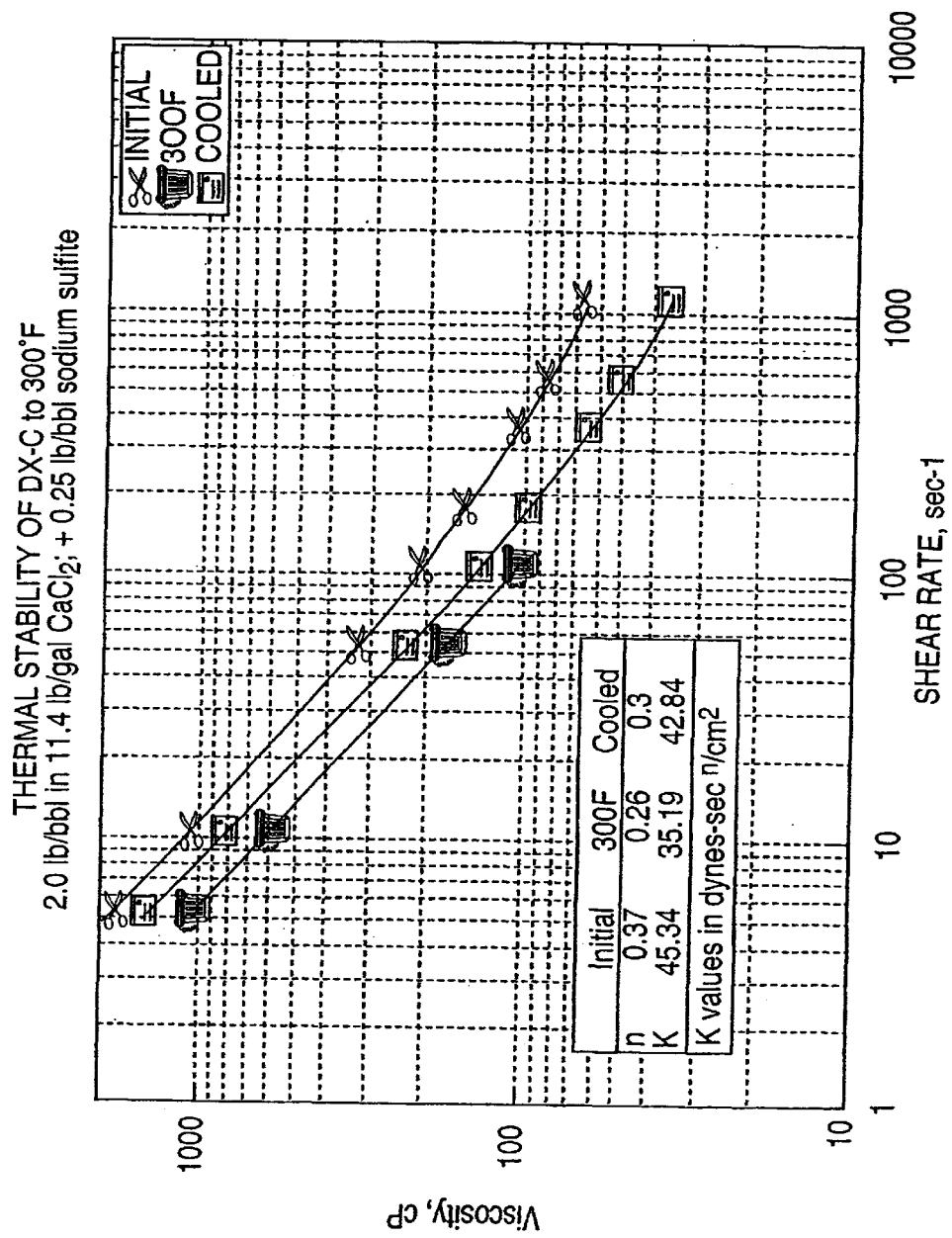
FIG. 4 depicts thermal stability of differentiated xanthan.

Fann 50 tests to 280–300° F. indicated a lack in thermal stability (FIG. 1) for a standard xanthan sample whereas DX-C provided substantial viscosity at temperature in the fluids tested (FIGS. 1 through 4). A 3 cycle test conducted in the 11.2 lb/gal brine using a concentration of 2.0 lb/bbl DX-C (FIG. 2) shows that DX-C can be used directly into an 11.4 lb/gal calcium chloride brine.

Of the samples tested, DX-C represents a significant improvement in functionality for calcium chloride brines in the 11.0 to 11.4 lb/gal density range. In addition, temperature stability at 300–310° F. is obtainable using magnesium oxide (MgO) and/or an oxygen scavenger. MgO is added to buffer pH in the alkaline range to improve polymer stability under elevated temperature conditions.

FIG. 5 compares the thermal stability of an NPX sample with that of two NPNAX samples and a standard xanthan sample. All of the samples were hydrated in a 1.32 g/cm$^3$ calcium chloride brine at a gum concentration of 0.0573 g/L. The figure indicates that the NPX sample gives a higher initial viscosity (180 cP) at 80° F. than the other three samples (130–150 cP). Upon heating to 300° F. and holding for one hour, the NPX solution continues to maintain a higher viscosity than for the other xanthan types. Upon cooling, the NPX solution maintains a higher viscosity (120 cP) than either of the NPNAX (55, 60 cP) or standard xanthan (15 cP) solutions. The NPX solution not only gives a higher return viscosity after going through the heating and cooling cycle than the other solutions but also maintains a higher percentage of its initial viscosity, thus indicating improved thermal stability. This data also shows that NPNAX gives significantly better thermal stability in the 1.32 g/cm$^3$ calcium chloride brine than standard xanthan.

From the foregoing description, one skilled in the art can easily ascertain the essential characteristics of this invention, and without departing from the spirit and scope thereof, can make various changes and modifications of the invention to adapt it to various usage's and conditions.

What is claimed is:

1. A drilling or completion fluid comprising a pyruvate-free xanthan and a calcium-based brine, wherein the calcium-based brine has a density of at least about 1.08 g/cm$^3$.

2. The fluid of claim 1 wherein the calcium-based brine has a density of at least about 1.20 g/cm$^3$.

3. The fluid of claim 2 wherein the calcium-based brine has a density of about 1.32 g/cm$^3$ to about 1.39 g/cm$^3$.

4. The fluid of claim 1 wherein the pyruvate-free gum is acetate-free.

5. The fluid of claim 1 wherein the calcium-based brine is a calcium chloride-based brine.

6. The fluid of claim 1 further comprising magnesium oxide, an oxygen scavenger, or mixtures thereof.

7. The fluid of claim 1 wherein the pyruvate-free xanthan is a genetically prepared pyruvate-free xanthan.

8. The fluid of claim 1 wherein the pyruvate-free xanthan concentration in the brine is about 0.01 to about 0.20 g/L.

9. In a process for recovering crude oil from an oil-bearing subterranean formation by drilling the formation, the improvement comprises using a drilling fluid comprising a pyruvate-free xanthan and a calcium-based brine, wherein the calcium-based brine has a density of at least about 1.08 g/cm$^3$.

10. The process of claim 9 wherein the calcium-based brine has a density of at least about 1.20 g/cm$^3$.

11. The process of claim 10 wherein the calcium-based brine has a density of about 1.32 g/cm$^3$ to about 1.39 g/cm$^3$.

12. The process of claim 9 wherein the pyruvate-free gum is acetate-free.

13. The process of claim 9 wherein the calcium-based brine is a calcium chloride-based brine.

14. The process of claim 9 wherein the drilling fluid further comprises magnesium oxide, an oxygen scavenger, or mixtures thereof.

15. The process of claim 9 wherein the pyruvate-free xanthan is a genetically prepared pyruvate-free xanthan.

16. The process of claim 9 wherein the pyruvate-free xanthan concentration in the brine is about 0.01 to about 0.20 g/L.

17. In a process for recovering crude oil from an oil-bearing subterranean formation, the improvement comprises using a completion fluid comprising a pyruvate-free xanthan and a calcium-based brine, wherein the calcium-based brine has a density of at least about 1.08 g/cm$^3$.

18. The process of claim 17 wherein the calcium-based brine has a density of at least about 1.20 g/cm$^3$.

19. The process of claim 17 wherein the calcium-based brine has a density of about 1.32 g/cm$^3$ to about 1.39 g/cm$^3$.

20. The process of claim 17 wherein the pyruvate-free gum is acetate-free.

21. The process of claim 17 wherein the calcium-based brine brine is a calcium chloride-based brine.

22. The process of claim 17 wherein the drilling fluid further comprises magnesium oxide, an oxygen scavenger, or mixtures thereof.

23. The process of claim 17 wherein the pyruvate-free xanthan is a genetically prepared pyruvate-free xanthan.

24. The process of claim 17 wherein the pyruvate-free xanthan concentration in the brine is about 0.01 to about 0.20 g/L.

* * * * *

UNITED STATES PATENT AND TRADEMARK OFFICE
CERTIFICATE OF CORRECTION

PATENT NO. : 6,573,221 B2
DATED : June 3, 2003
INVENTOR(S) : Todd Talashek et al.

It is certified that error appears in the above-identified patent and that said Letters Patent is hereby corrected as shown below:

Column 8,
Line 26, "17" has been replaced with -- 18 --.

Signed and Sealed this

Twenty-fifth Day of November, 2003

JAMES E. ROGAN
*Director of the United States Patent and Trademark Office*